(12) United States Patent
Walter et al.

(10) Patent No.: US 8,500,338 B2
(45) Date of Patent: Aug. 6, 2013

(54) STEERING KNUCKLE WITH PRE-SEALING

(75) Inventors: Wilhelm Walter, Poppenhausen (DE); Erwin Hartmann, Bergrheinfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 261 days.

(21) Appl. No.: 13/058,936

(22) PCT Filed: Jul. 14, 2009

(86) PCT No.: PCT/EP2009/058969
§ 371 (c)(1), (2), (4) Date: Feb. 14, 2011

(87) PCT Pub. No.: WO2010/018041
PCT Pub. Date: Feb. 18, 2010

(65) Prior Publication Data
US 2011/0148182 A1    Jun. 23, 2011

(30) Foreign Application Priority Data
Aug. 12, 2008 (DE) .......... 10 2008 038 682

(51) Int. Cl.
*F16C 33/80* (2006.01)
(52) U.S. Cl.
USPC ............ 384/488; 384/544; 464/178
(58) Field of Classification Search
USPC ......... 384/544, 589, 477, 480, 488; 464/170, 464/178
See application file for complete search history.

(56) References Cited

U.S. PATENT DOCUMENTS

| | | | | |
|---|---|---|---|---|
| 4,010,986 A * | 3/1977 | Otto | .............................. | 384/478 |
| 4,789,252 A * | 12/1988 | Dreschmann et al. | ........ | 384/486 |
| 5,240,333 A | 8/1993 | Hassiotis et al. | | |
| 5,725,285 A | 3/1998 | Niebling et al. | | |
| 5,813,675 A * | 9/1998 | Otto | .............................. | 277/549 |
| 5,885,162 A * | 3/1999 | Sakamoto et al. | ............ | 464/906 |
| 6,676,298 B2 * | 1/2004 | Schote | ......................... | 384/477 |
| 6,976,790 B2 * | 12/2005 | Min | ............................. | 384/488 |
| 2002/0049091 A1 | 4/2002 | Ogura et al. | | |
| 2007/0086690 A1 * | 4/2007 | Niebling et al. | ............. | 384/544 |
| 2008/0131045 A1 * | 6/2008 | Nagayama et al. | .......... | 384/544 |

FOREIGN PATENT DOCUMENTS

| | | |
|---|---|---|
| DE | 92 03 402 | 4/1992 |
| DE | 100 09 216 | 8/2001 |
| DE | 10 2004 048 654 A | 4/2006 |
| EP | 1 890 046 A | 2/2008 |
| JP | 2007 132454 A | 5/2007 |
| JP | 2007 192392 A | 8/2007 |
| WO | 03/071148 A | 8/2003 |
| WO | 2009/057269 | 5/2009 |

* cited by examiner

*Primary Examiner* — Thomas R Hannon
(74) *Attorney, Agent, or Firm* — Lucas & Mercanti, LLP

(57) ABSTRACT

A steering knuckle, which is provided for receiving an outer ring of a wheel bearing, and a wheel bearing arrangement with such a steering knuckle. The sealing arrangements of the wheel bearing has a pre-seal, which is designed as a labyrinth seal to provide sealing for an appropriate gap geometry. To this end, the steering knuckle has a collecting channel, which captures liquids and dirt particles and discharges them at the periphery. The hearing seal can be changed by this measure, so that savings are possible with a minimum of sealing action of the conventional sealing arrangement and with greatly reduced friction torque. Overall, the sealing action, which is now achieved by the bearing seal and the pre-seal together, is increased or remains at least at the same level while manufacturing costs are reduced.

11 Claims, 4 Drawing Sheets

STEERING KNUCKLE WITH PRE-SEALING

This application is a 371 of PCT/EP2009/058969 filed Jul. 14, 2009, which in turn claims the priority of DE 10 2008 038 682.0 filed Aug. 12, 2008, the priority of both applications is hereby claimed and both applications are incorporated by reference herein.

FIELD OF THE INVENTION

The invention relates to a hub carrier, which is provided for the purpose of receiving an outer ring of a wheel bearing, and to a wheel bearing arrangement having a hub carrier of this kind.

BACKGROUND OF THE INVENTION

There are already many uses for hub carriers in the automotive sector. Within the wheel bearing arrangement, it is the function of a hub carrier to connect the wheel bearing firmly to the chassis or the body of a commercial vehicle, a passenger vehicle or a motorcycle.

In the production of modern motor vehicles, there is increasing emphasis on subassemblies that are already pre-installed, and these can generally be connected or attached to the vehicle or installed thereon in a relatively simple manner. The same applies to the hub carrier, into which it is generally possible to integrate a wheel bearing unit and which is fitted together with the latter. In this arrangement, the wheel bearing unit is connected to a component that transmits drive torque. A component of this kind could be a shaft or a joint bell, which ensures the desired positive engagement for torque transmission by means of longitudinal splines or end toothing, for example.

However, it is precisely these interfaces, which should be made as simple as possible for the production process that can prove problematic when it comes to environmental influences during operation. Thus, the mechanical interface mentioned is often situated in the vicinity of a gear-side (or alternatively vehicle-side) seal arrangement of the wheel bearing and is protected only inadequately against environmental influences.

US 2002/0049091 A1 has disclosed a wheel bearing unit in which the wheel bearing is screwed to the joint bell by way of a flat rolled collar and can be put into operation by means of longitudinal splines. The gear-side seal arrangement of the double-row angular ball bearing is formed by a cartridge seal, which achieves an enhanced sealing action in comparison with seal arrangements that have a sealing and a centrifugal ring.

The teaching of the existing prior art consequently aims to enhance the sealing action of the gear-side seal arrangement in order to avoid the ingress of foreign particles into the wheel bearing, but this can lead to significant reductions in the life of the wheel bearing.

DE 92 03 402 has disclosed a bearing seal for motor vehicles which, as part of a wheel-side seal arrangement, has a ring element which is fastened to the outer ring of the wheel bearing and allows dirt particles to be carried away circumferentially.

Fundamentally, there is a similar problem with the wheel-side seal arrangement, just as with the gear-side seal arrangement, but the proximity and size of the rim and also of the brake disk ensures that there is already very good shielding from environmental influences, similar to that with a labyrinth seal. The problem is all the greater in the case of the gear-side seal arrangement, on which the demands are very great.

Moreover, it must be stressed that a measure aimed at enhancing the sealing action of one of the two seal arrangements generally leads to an increased frictional torque in the seal, more specifically at the sealing lips thereof, and hence inevitably leads to increased fuel consumption.

SUMMARY OF THE INVENTION

It is therefore the object of the invention to substantially reduce the environmental influences on at least one seal arrangement of a wheel bearing.

The object is achieved by a hub carrier of the type stated at the outset by virtue of the fact that, to protect a seal arrangement of the wheel bearing, the hub carrier has a collecting channel, which is provided for the purpose of catching liquids, especially water, and dirt particles and carrying them away circumferentially. The object is furthermore achieved with a wheel bearing arrangement that has a hub carrier of this kind.

The invention is based on the insight that previous solutions are restricted exclusively to enhanced sealing actions, which take effect directly on the wheel bearing seal, between the inner ring and the outer ring.

According to the invention, the wheel bearing arrangement is provided for the purpose of receiving an outer ring of a wheel bearing and of protecting a seal arrangement of the wheel bearing. For this purpose, the wheel bearing arrangement, in particular a hub carrier of the wheel bearing arrangement, has a pre-seal, which is provided for the purpose of relieving or protecting the seal arrangement of the wheel bearing. A pre-seal of this kind is useful especially for gear-side seal arrangements but can also be used to protect a wheel-side seal arrangement, or both seal arrangements.

The entire pre-seal, or just part of the pre-seal, is designed as a collecting channel on the hub carrier, which is provided for the purpose of collecting dirt particles and carrying them away circumferentially. For this purpose, the collecting channel can be provided in the vicinity of the gear-side seal arrangement and/or of a wheel-side seal arrangement. In both cases, the intention is to keep spray that has reached the hub carrier during operation away from the respective seal arrangement by ensuring that the dirt and/or water collects in the collecting channel and is carried around the axis of rotation of the wheel bearing in the circumferential direction by said channel on that it can ultimately be discharged onto the roadway.

A collecting channel thus forms a calming space or accumulation space, the radial diameter of which is greater than that of the seal arrangement in the wheel bearing but advantageously less than the maximum radial extent of adjoining components such as the joint bell, for example. The effect of this is that water (and hence also dirt particles) collects at the radially outermost point of the rotating joint bell during operation and is slung away from there, possibly reaching the hub carrier again, from where it can flow directly into the collecting channel.

It is thus possible to modify the seal arrangement of the wheel bearing in such a way that, by virtue of the pre-seal, the same sealing effect or a better sealing effect can still be achieved with a minimum sealing action while additionally allowing a saving of material in the seal arrangement. Moreover, it is also possible to dispense with contact seals, thereby ensuring that there is a significant drop in fuel consumption.

In the above embodiments, the configuration of the pre-seal, i.e. especially the collecting channel, can be produced with little effort through design modifications to customer components.

In an advantageous embodiment, the wheel bearing arrangement has not only the hub carrier but also a wheel hub and a joint bell, which can be connected, in particular screwed, to the wheel hub, wherein the hub carrier forms a seal gap with the wheel hub and/or the hub carrier forms a seal gap with the joint bell. In this case, the seal gap is embodied entirely in the manner of a labyrinth seal in such a way that it assumes perpendicular, parallel or combined orientations with respect to the axis of rotation of the wheel bearing at different points in order to effectively prevent the ingress of water and dirt while the vehicle is in operation or stationary. In this arrangement, the components which help to form the seal gap are matched to one another in terms of their shape.

In an advantageous embodiment, the seal gap opens into the collecting channel of the hub carrier. In this arrangement, the components forming the seal gap may comprise the wheel hub and the hub carrier or the joint bell and the hub carrier or all 3 components. The important point is that the sealing gap should be directed into the calming space (accumulation space) of the collecting channel without the water in the collecting channel being able to get into the sealing gap. This applies both when the vehicle is in operation and when it is stationary.

When stationary, the ingress of water and dirt into the seal gap can be prevented if the collecting channel is at a shorter radial distance from the axis of rotation of the wheel bearing than the mouth or mouth opening of the seal gap. The upper part of the collecting channel in relation to the roadway is therefore lower than the mouth of the sealing gap, thus preventing ingress into the sealing gap due to gravity. Moreover, the water together with dirt runs away circumferentially in the collecting channel, which is annular overall, and enters that part of the collecting channel which faces the roadway, from where it can drip away.

While the vehicle is being driven, the ingress of water and dirt is prevented by the fact that the water together with dirt is not slung out of the collecting channel directly into the interspace between the hub carrier and the joint bell or between the hub carrier and the rim when subjected to shocks, owing to surface tension forces, but remains on the hub carrier and flows away circumferentially via the collecting channel, as when the vehicle is stationary. The fact that the hub carrier per se is a fixed component and the water or dirt collected cannot be slung out of the collecting channel is advantageous in this context.

In an advantageous embodiment, the mouth of the seal gap is formed by a cylindrical extension of the hub carrier, the maximum radial distance of which from the axis of rotation of the wheel bearing is greater than the smallest radial distance of the collecting channel. Such a cylindrical extension can be formed directly on the hub carrier, i.e. both components are embodied in a single component.

In an advantageous embodiment, the seal gap is arranged substantially parallel to the axis of rotation of the bearing or is oriented toward the axis of rotation in the vicinity of the mouth region. In principle, the angle of inclination enclosed by the mouth of the seal gap and the axis of rotation of the bearing can advantageously be chosen so that local air flow or flow conditions can be taken into account in order to prevent ingress of water and dirt particles into the sealing gap in an effective manner. In this context, it may be advantageous to form the collecting channel on the hub carrier or, alternatively, to form the hub carrier in the vicinity of the collecting channel with regard to flow considerations. Thus, for example, an integrally formed annular feature on the hub carrier could prevent the water in the collecting channel from being taken up by air movements.

It is advantageous if the wheel hub, the joint bell and/or part of the cardan shaft has a cylindrical seal or a cylindrical extension, which is provided in the vicinity of the mouth region in order to form the seal gap. The advantage with this arrangement is that a slinging effect arises owing to the rotary motion of the joint bell and/or the wheel hub, making it impossible for dirt to enter inasmuch as said dirt is slung in the direction of the hub carrier or even in the direction of the collecting channel by the cylindrical seal. If the seal gap is already contaminated, this can be effectively reduced by the rotary motion since the dirt particles are conveyed directly into the collecting channel and carried away via the mouth of the seal gap.

In an advantageous embodiment, the joint bell or the wheel hub has a fastenable seal element, which is provided in the vicinity of the mouth region in order to form the seal gap, and does not necessarily have to be formed on the joint bell or the wheel hub but can also be fastened thereto. In the case of the one-piece solution, there is the advantage that the number of components is smaller. In the case of a separate seal element, there is, on the other hand, a structural advantage, which makes it possible to install the wheel bearing arrangement more easily and at the same time to use a seal element which can project a long way into the hub carrier in the mouth region because it guarantees deposition of water and dirt, in a relatively deep collecting channel for example. Moreover, this enhances the possibility of a labyrinth-type seal gap shape and hence also the pre-sealing action.

In conjunction with the advantages mentioned hitherto, there is a further advantage through the cascade-type staggering of the seal arrangement on the wheel bearing combined with the pre-seal based on the collecting channel. This is because the sealing requirements on the seal arrangement are significantly reduced when the abovementioned embodiments are combined. In some cases, the result is that lip seals present in the seal arrangement and having a very small overlap or a virtually O-overlap can be implemented without sacrificing sealing performance. The frictional torque is thus significantly reduced and there is a saving of fuel.

BRIEF DESCRIPTION OF THE DRAWINGS

Further preferred embodiments and developments of the invention can be found in the description of the figures and the subclaims.

The present invention will be further understood and appreciated by reading the following description in conjunction with the accompanying drawings, in which.

DETAILED DESCRIPTION OF THE INVENTION

Figure 1:
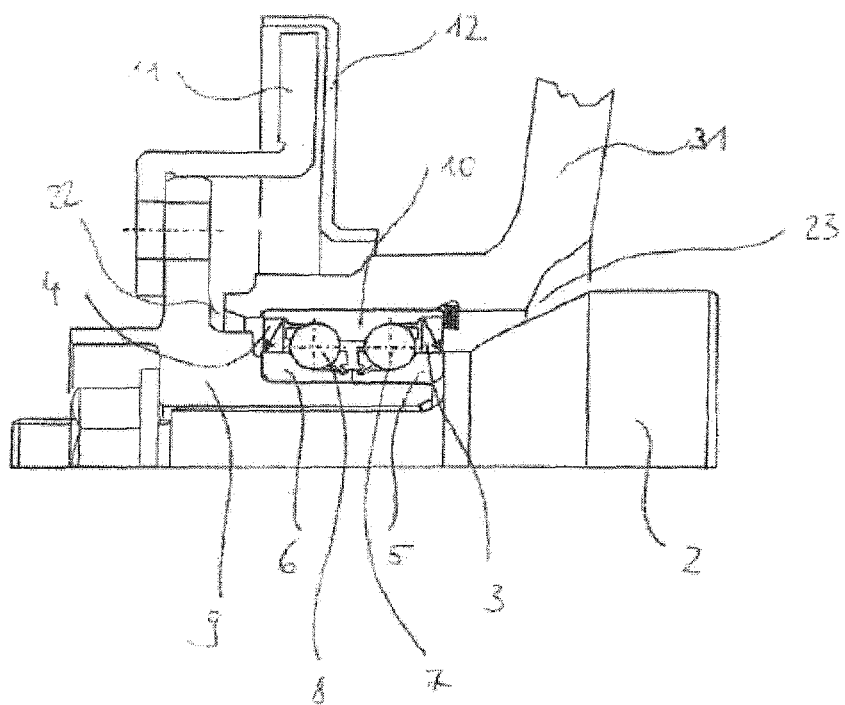
FIG. 1 shows a sectioned view of a wheel bearing arrangement with a two-row angular ball bearing in accordance with the prior art.

FIG. 1 shows a sectioned view of a wheel bearing arrangement with a two-row angular ball bearing in accordance with the prior art.

The wheel bearing, comprising two rows 7, 8 of rolling contact elements, two inner rings 5, 6 and an outer ring 10. Arranged between the gear-side inner ring 5 and the outer ring 10 is a seal arrangement 3, which protects the wheel bearing from environmental influences acting on the wheel bearing through the gear-side gap 23 between the hub carrier 31 and the joint bell 2. In corresponding fashion, there is a wheel-side seal arrangement 4 between the wheel-side inner ring 6 and the outer ring 10, providing protection from environmental influences which act on the wheel bearing through a wheel-side gap 22 between the wheel hub 9 and the hub carrier 31. In comparison with the gear-side gap 23, the wheel-side gap 22 is in a relatively protected position, especially as it is relatively well protected from environmental influences, in the manner of a labyrinth seal, by the wheel flange of the wheel hub 9 and by the brake disk arrangement consisting of brake disk 11 and guard plate 12.

In FIG. 1 and in the following figures, the "wheel side" corresponds to the left and the "gear side" corresponds to the right.

Figure 2:
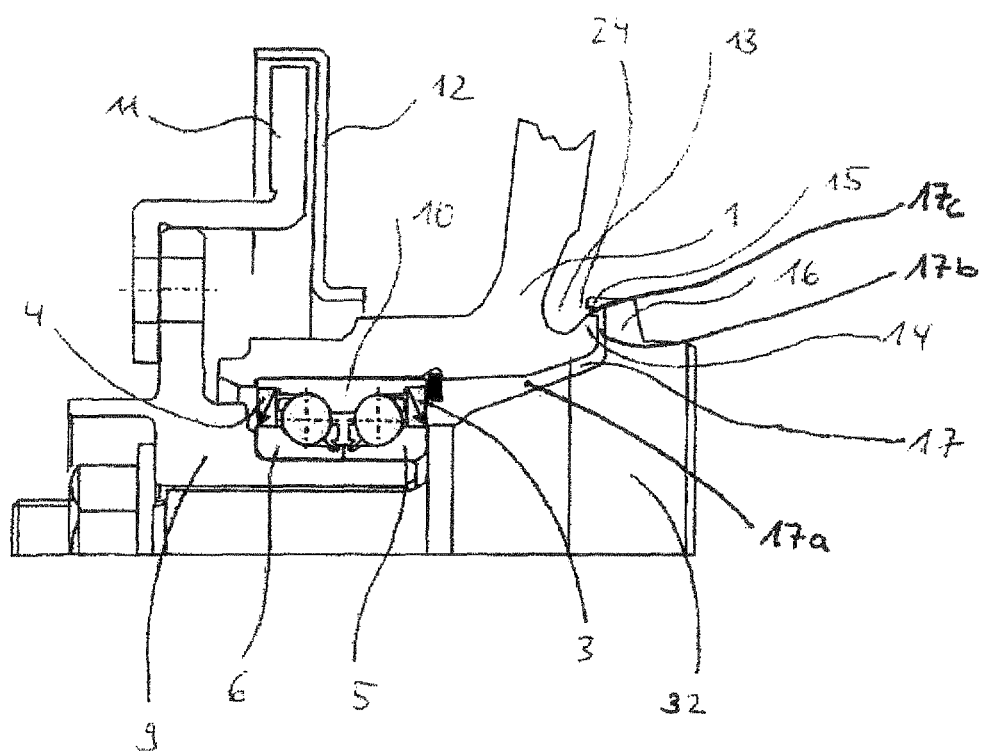
FIG. 2 shows a sectioned view of a wheel bearing arrangement according to the invention, having a gear-side seal arrangement with a pre-seal.

FIG. 2 shows a sectioned view of a wheel bearing arrangement according to the invention, having a gear-side seal arrangement 3 with a pre-seal.

In the illustrative embodiment shown, the inlet gap geometry shown has a seal gap 17 instead of a gear-side gap 23 (as in FIG. 1). Here, the inlet gap geometry has been modified in such a way that a specific form of a pre-seal based on a labyrinth seal is formed.

On the one hand, the hub carrier 1 has a collecting channel 13, the depth of which is determined by a cylindrical extension 14 of the hub carrier 1. The cylindrical extension 14 is matched to the shape of the facing joint bell 32 in order to achieve a small gap width for the seal gap 17. The seal gap 17 is formed by a radial gap 17a, an axial gap 17b and another radial gap 17c. The radial gap 17a is that portion of the seal gap 17 which, as shown in FIG. 2, extends radially only slightly away from the axis of rotation in the direction of the vehicle and then, after a bend, merges into the axial gap 17b. The axial gap 17b is very limited in terms of its axial extent, and this is already beneficial per se to the entire sealing behavior. In the same way, the radial gap 17a varies only insignificantly in the radial direction. However, it is also advantageous to leave the radial boundary surfaces defining the radial gap 17a parallel to the axis of rotation over the length of the radial gap 17a. In the section plane, this leads to a right-angled arrangement of the two parts of the seal gap 17 and hence to separation into a zone that is active in terms of conveyance (annular axial gap 17b) and a zone that is passive in terms of conveyance (cylindrical radial gap 17a). In the annular axial gap 17b, water and dirt particles are conveyed continuously outward in relation to the axis of rotation by the centrifugal force. In the cylindrical radial gap 17a, however, there is no bias in favor either of movement in the direction of the wheel or in the direction of the vehicle.

The radial gap 17c may prove to be particularly effective in terms of sealing, said gap at least partially comprising the likewise cylindrical radial gap 17a and similarly representing a zone that is passive in terms of conveyance. However, it is not only possible for the radial gap 17c to be cylindrical (as shown); it can also be of conical design, and the entry of water or dirt particles in the mouth region 24 of the seal gap 17 can be further suppressed by appropriate orientation relative to the axis of rotation. Such orientation angles can vary from 0° to 90°, and the radial gap 17c may widen or narrow in the mouth region. The important point is that water or dirt particles should not readily be able to pass from the collecting channel 13 into the seal gap 17. In the embodiment shown in FIG. 2, a partially semicircular gap shape of the seal gap 17 is achieved in combination with the joint bell 32 and the integrally formed cylindrical seal 16 thereof. At the same time, this gap shape can include one or more direction changes from axial to radial and from radial to axial directions, thereby making it even more difficult for environmental influences to penetrate to the gear-side (right-hand) seal arrangement 3 and hence to the wheel bearing itself, without any contact seal component at all.

It is advantageous if the seal gap 17 is of loop-shaped or S-shaped design or in the form of a serpentine line in the radial direction in order to reduce the environmental influences further. The decisive factor here is the fact that dirt particles not only have to move in the axial direction but also radially, i.e. alternately with and counter to the centrifugal forces of the rotating joint bell 32. During this process, the characteristics of shielding, throttling, deflecting and redirecting liquids are used very advantageously in order to keep away said liquids and the dirt particles they contain.

It is advantageous if, together with the cylindrical extension 14 of the hub carrier 1, a cylindrical extension 15 of the cylindrical seal 16 forms a mouth of the seal gap 17 by which it opens into the collecting channel 13. One advantage of this is that covering of the seal gap 17 in the radial direction is achieved by means of the extension 15. Another advantage is that dirt particles and water are first of all collected in the collecting channel 13, even before they can enter the seal gap 17 in the vicinity of the mouth opening, i.e. by passing the extensions 15, 17. It is unimportant here whether the dirt particles enter the collecting channel 13 via the covering cylindrical seal 16, or the cylindrical extension 15 thereof, or move downward along the hub carrier 1 in the direction of the roadway so as ultimately to enter the collecting channel 13.

Another advantage of this illustrative embodiment is the small number of components used for the pre-seal arrangement. Basically, there is no need for any new components if the parts that form the seal gap are connected in one piece with the joint bell 32 and the hub carrier 1.

It is likewise conceivable, if there is a concern for low weight of the joint bell 32 for example, to form only the hub carrier 1 to achieve a pre-sealing action, through the presence of the collecting channel 13 and also through an advantageous proximity to a conventional joint bell. This makes it possible to use conventional joint bells instead of the joint bell 32 shown while nevertheless achieving a certain pre-sealing.

Figure 3:
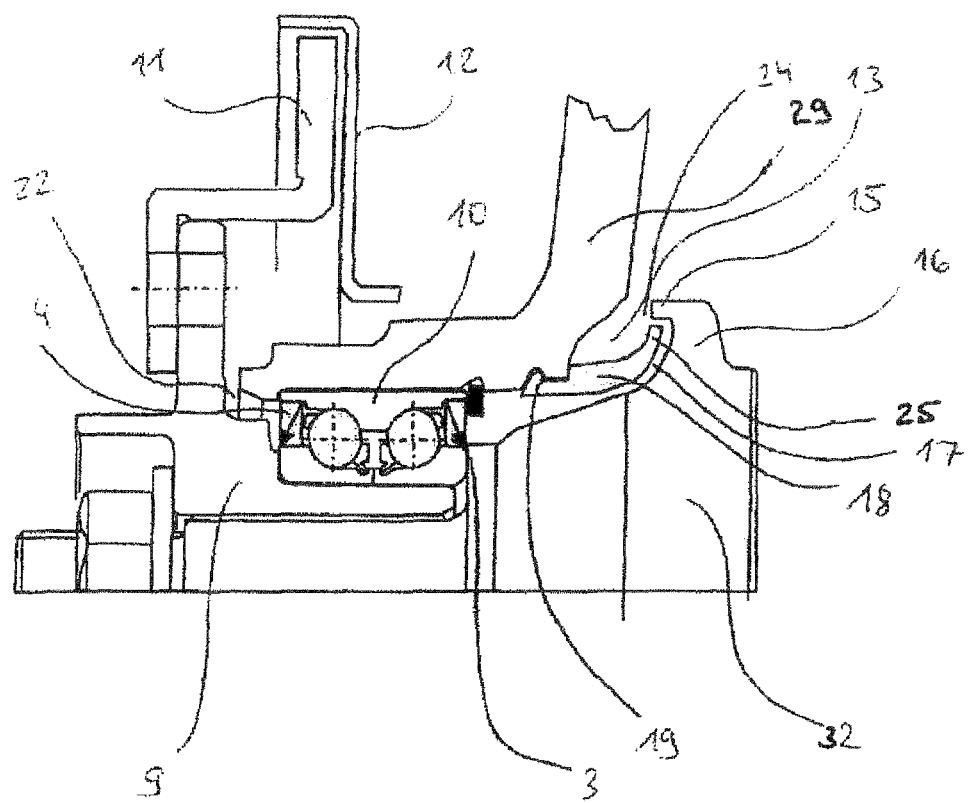
FIG. 3 shows a sectioned view of a wheel bearing arrangement according to the invention, having a pre-seal based on a fastenable collecting ring.

FIG. 3 shows a sectioned view of a wheel bearing arrangement according to the invention, having a pre-seal based on a fastenable collecting ring 18.

In this illustrative embodiment, the operation of the pre-seal is not different from that in the preceding illustrative embodiment but the collecting channel 13 is formed by a fastenable collecting ring 18, which can influence the collecting properties of the collecting channel 13 in an advantageous manner in the same way by means of its shape.

It is also advantageous that the collecting ring 18 can be retrofitted since easy installation on the hub carrier 29 or simple exchange is made possible by means of a snap fastening 19 or some similar fastening of this kind. However, it is important that the fastening should withstand environmental influences, especially water, acids and other dirt particles, especially since the collecting ring 18 forms the collecting channel 13.

As with the preceding illustrative embodiment, an extension 25 of the collecting ring 18, together with the extension 15 of the cylindrical seal 16, forms the mouth openings of the seal gap 17.

The possibility of selecting the material of the collecting ring 18, which can be embodied as a plastic ring for example and hence is not subject to any corrosion, is also advantageous. Other materials can be used, depending on their stability.

Figure 4:
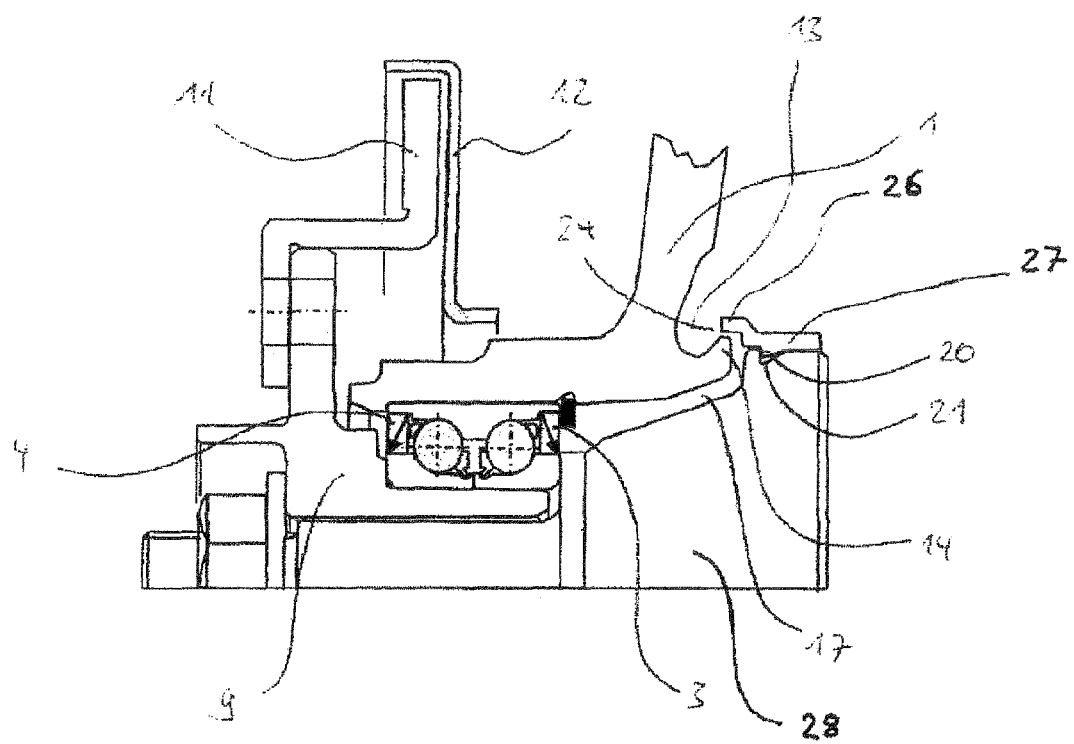
FIG. 4 shows a sectioned view of a wheel bearing arrangement according to the invention, having a pre-seal based on a fastenable seal element.

FIG. 4 shows a sectioned view of a wheel bearing arrangement according to the invention, having a pre-seal based on a fastenable seal element 27.

The covering of the seal gap 17 is achieved by means of a fastenable seal element 27, and the mouth of the seal gap 17 of the mouth region 24 is formed by the cylindrical extension 14 of the hub carrier 1 and the cylindrical extension 26 of the fastenable seal element 27. In this arrangement, the fastenable seal element 27 has a radially inner fastening ring 20, which can be snapped onto the joint bell 28, or into the fastening groove 21 thereof. The fastenable seal element 27 is thus provided with a secure grip and will not drift either toward the wheel or toward the gear during operation.

Apart from the advantageous fastening method, the fastenable seal element 27 achieves the same sealing action as the cylindrical seal 16 (in FIG. 3).

Attention is drawn to the fact that the illustrative embodiments taught and their features can be combined with one another to obtain different refinements in accordance with the invention. For example, the illustrative embodiments in FIGS. 3 and 4 can be combined in such a way that the advantageous wheel bearing arrangement has both a collecting ring 18 (from FIG. 4) and a fastenable seal element 27 (from FIG. 3). The combination of features once again gives rise to synergies, such as the advantageous possibility of retrofitting the pre-seal in the case mentioned for example, especially since the parts which form the seal gap and the collecting channel are not connected in one piece with the hub carrier 29 and the joint bell 28 and can be employed retrospectively or interchanged. It is advantageous if the retrofittable pre-seal is limited to a collecting ring and a cylindrical cover, which can be offered as a separate product.

A further possibility for combining the illustrative embodiments from the individual figures consists in providing an axial gap 17b and two radial gaps 17a, 17c of the kind known from FIG. 2 in a corresponding manner in the other illustrative embodiments in FIGS. 3 and 4 as well, that is to say that the components forming the seal gap can be adapted accordingly to the shape thereof.

Where reference signs in a figure are not discussed within the description of that figure, the statements relating to the designated object in the descriptions of the other figures apply.

In summary, the invention relates to a hub carrier, which is provided for the purpose of receiving an outer ring of a wheel bearing, and to a wheel bearing arrangement having a hub carrier of this kind. The aim is to relieve a seal arrangement of the wheel bearing by means of a pre-seal which is embodied as a labyrinth seal and achieves an advantageous pre-sealing action by virtue of an appropriate gap geometry. For this purpose, the hub carrier has a collecting channel, which is provided for the purpose of catching liquids and dirt particles and carrying them away circumferentially. By means of this measure, the bearing seal can be modified in such a way that savings are possible with a minimum sealing action by the conventional seal arrangement and with a greatly reduced frictional torque. Overall, the sealing action is increased, said sealing action now being achieved by the bearing seal and the pre-seal together, or remains at least at the same level with lower production costs.

LIST OF REFERENCE SIGNS

1 Hub carrier
2 Joint bell
3 Gear-side seal arrangement
4 Wheel-side seal arrangement
5 Gear-side inner ring
6 Wheel-side inner ring
7 Gear-side row of rolling contact elements
8 Wheel-side row of rolling contact elements
9 Wheel hub
10 Outer ring
11 Brake disk
12 Guard plate
13 Collecting channel
14 Cylindrical extension of the hub carrier
15 Cylindrical extension of the seal element
16 Cylindrical seal
17 Seal gap
17c Radial gap
18 Collecting ring
19 Snap fastening
20 Fastening ring
21 Fastening groove
22 Wheel-side gap
23 Gear-side gap
24 Mouth region of the seal gap
25 Extension of the collecting ring
26 Cylindrical extension of the fastenable seal element
27 Fastenable seal element
28 Joint bell
31 Hub carrier
32 Joint bell

The invention claimed is:

1. A hub carrier for receiving an outer ring of a wheel bearing having a seal arrangement, the wheel bearing supporting a hub and a joint bell, the hub carrier comprising:
    a collecting channel arranged to catch and circumferentially carry away liquids so as to protect the seal arrangement of the wheel bearing; and
    a cylindrical extension defining at least a portion of the collecting channel and defining a seal gap between the hub carrier and the joint bell when the wheel bearing is received in the hub carrier, such that the seal gap opens into the collecting channel of the hub carrier.

2. The hub carrier of claim 1, wherein the seal arrangement is a gear-side seal arrangement, the collecting channel being formed on or fastened to the hub carrier on a gear side, in a vicinity of the gear-side seal arrangement.

3. A wheel bearing arrangement, comprising:
    a wheel hub;
    a seal arrangement;
    a hub carrier having a collecting channel arranged to catch and circumferentially carry away liquids so as to protect the seal arrangement;
    a joint bell that can be screwed to the wheel hub,
    wherein the hub carrier forms a seal gap with the wheel hub and/or the joint bell, and
    wherein the seal gap opens into the collecting channel of the hub carrier.

4. The wheel bearing arrangement of claim 3, wherein the hub carrier has a cylindrical extension and the seal gap has a mouth that is formed by the cylindrical extension of the hub carrier, a maximum radial distance of the cylindrical extension from an axis of rotation of the wheel bearing being greater than a smallest radial distance of the collecting channel from the axis of rotation.

5. The wheel bearing arrangement of claim 4, wherein the seal gap is substantially parallel to the axis of rotation of the bearing in a vicinity of the mouth.

6. The wheel bearing arrangement of claim 4, wherein the seal gap is oriented toward the axis of rotation of the wheel bearing in a vicinity of the mouth.

7. The wheel bearing arrangement of claim 3, wherein the seal gap has a mouth region, the joint bell having a cylindrical seal, which is provided in a vicinity of the mouth region so as to form the seal gap.

8. The wheel bearing arrangement of claim 3, wherein the seal gap has a mouth region, the joint bell having a fastenable seal element that is provided in a vicinity of the mouth region so as to form the seal gap.

9. The wheel bearing arrangement of claim 3, wherein the wheel hub includes a cylindrical extension that defines a portion of a mouth region of the seal gap.

10. A pre-seal for protecting a seal arrangement of a wheel bearing, the wheel bearing supporting a hub and a joint bell wherein the pre-seal has a channel ring which at least partially forms a collecting channel and is fastenable to a hub carrier, the channel ring further defining a seal gap between the hub carrier and the joint bell when the wheel bearing is received in the hub carrier, such that the seal gap opens into the collecting channel of the hub carrier.

11. The pre-seal of claim 10, further comprising a seal element fastenable to a joint bell or to a wheel hub of the wheel bearing so that the seal element at least partially forms a mouth of the seal gap that is oriented toward the collecting channel.

* * * * *